United States Patent [19]
Schaub

[11] 3,795,848
[45] Mar. 5, 1974

[54] COLLECTORLESS D. C. MOTOR

[75] Inventor: Gerhard Schaub, Nuremberg, Germany

[73] Assignee: Gebr Buhler Nachfolger GmbH, Nurnberg, Germany

[22] Filed: Mar. 21, 1972

[21] Appl. No.: 236,707

[30] Foreign Application Priority Data
  Apr. 1, 1971  Germany............................ 2115777

[52] U.S. Cl. ............................................. 318/138
[51] Int. Cl. ........................................... H02k 29/02
[58] Field of Search ... 318/138, 326, 327, 341, 331, 318/254

[56] References Cited
UNITED STATES PATENTS

| | | | |
|---|---|---|---|
| 3,488,566 | 1/1970 | Fukuda | 318/138 |
| 3,581,173 | 5/1971 | Hood | 318/138 |
| 3,611,081 | 10/1971 | Watson | 318/138 |
| 3,662,237 | 5/1972 | Favre | 318/138 |
| 3,683,248 | 8/1972 | Kobayashi | 318/138 |
| 3,368,128 | 2/1968 | Parrish | 318/326 |
| 3,290,572 | 12/1966 | Hartmann | 318/326 |
| 3,584,280 | 6/1971 | Inagaki | 318/138 |
| 3,577,057 | 5/1971 | Dyer | 318/341 |

*Primary Examiner*—Bernard A. Gilheany
*Assistant Examiner*—Thomas Langer
*Attorney, Agent, or Firm*—Michael S. Striker

[57] ABSTRACT

A collectorless D.C. motor includes a rotor, a stator, and a plurality of stator windings arranged on the stator in angularly spaced relationship. Each winding when energized produces a stationary magnetic field having a respective orientation. A control circuit including an oscillator energizes successive ones of the windings for respective time intervals determined by the oscillatory frequency of the oscillator. The resulting magnetic field revolves with an angular velocity determined by the oscillator.

15 Claims, 2 Drawing Figures

COLLECTORLESS D. C. MOTOR

BACKGROUND OF THE INVENTION

The invention relates to D.C. motors, and particularly to collectorless D.C. motors of the revolving-field type.

Still more particularly, the invention relates to collectorless D.C. motors which comprise a permanent magnet rotor and a multi-pole stator provided with a plurality of stator windings, each of which is connected to and disconnected from a D.C. source by means of an electric control circuit.

Collectorless D.C. motors are already known. In general, they comprise means for establishing a revolving magnetic field and a permanently magnetic, or otherwise magnetized, rotor which follows such revolving field. These constructions have employed a plurality of discrete stator windings provided around the periphery of the stator of the motor and distributed at equal angular intervals. The revolving magnetic field was produced by connecting successive ones of the stator windings to a D.C. voltage source, the windings being connected in succession so as to produce an overall magnetic field whose net orientation rotates in the desired direction. The energization of successive windings was accomplished by means of electronic control circuitry, and sometimes also by mechanical means.

Several constructions are known. In one such construction, an auxiliary collector controls the energization of successive stator windings as a function of rotor position. This approach is analogous to conventional mechanical commutation in ordinary D.C. motors, inasmuch as the control of stator winding current is effected as a direct function of rotor position.

Auxiliary collectors according to the prior art have been available in several forms. According to prior-art constructions, the auxiliary collector comprised Hall generators, field plates, or other inductive pick-ups distributed about the periphery of the rotor in angular correspondence to the distribution of the several stator windings. The auxiliary collector has also been provided in form of a mechanical sliding-contact or wiper. Such mechanical wipers guarantee a high starting torque and conventionally, when the desired rotor speed has been reached, are lifted free of their tracks by a centrifugal actuator or the like. It will be appreciated, of course, that such mechanical sliding-contacts, because of their susceptibility to wear, are hardly more advantageous than conventional brushes of commutated D.C. motors.

SUMMARY OF THE INVENTION

It is one object of the present invention to overcome the disadvantages of prior-art uncommutated D.C. motors, particularly those requiring mechanical auxiliary collectors.

It is another object of the invention to provide a D.C. motor in which a plurality of stator windings are provided on the stator and are successively energized, whereby to establish a revolving magnetic field.

It is still a further object to provide such a motor wherein the stator windings are successively energized and de-energized independently of rotor position.

It is yet another object of the invention to establish a revolving magnetic field in a D.C. motor without the use of mechanical collectors, auxiliary collectors, or commutators, and solely by electrical and electronic means.

It is still a further object of the invention to provide a collectorless D.C. motor having as nearly as possible the characteristics of a shunt-wound D.C. motor.

It is yet another object to provide such a motor wherein the stator windings are successively energized for respective time intervals which are predetermined and adjustable.

It is an additional object to provide such a motor as a speed-variable synchronous motor.

It is a further object to provide such a motor as a speed-variable synchronous motor whose synchronous speed automatically rises from zero to a desired value without operator control of the actual start-up operation.

It is a further object to provide such a motor with automatic speed-regulation capability.

These objects, and others which will become apparent from the following description, are met by a construction for a collectorless D.C. motor which comprises a rotor, a stator, a plurality of stator windings arranged on the stator in angularly spaced relationship and each producing when energized a stationary magnetic field having a respective orientation. Furthermore, control circuit means including an oscillator circuit controls energization of successive ones of the stator windings for respective time intervals determined by the oscillatory frequency of the oscillator. In this way, a revolving magnetic field is produced whose angular velocity is determined by the oscillatory frequency of the oscillator.

The motor according to the invention is characterized by extreme flexibility and completeness of control, it having if desired the operating characteristics of a shunt motor, and its various operating parameters being adjustable according to the needs of specific applications.

In the steady-state the motor according to the invention operates as a synchronous motor, because the frequency of the revolving magnetic field is electrically determined. On the other hand, the motor of the invention has the characteristic of a shunt-wound motor, in that it is speed-adjustable while having a speed that is largely independent of the torque which it must develop during use.

In particular, the control of the field frequency by means of an oscillator is most advantageous, because it permits simple start-up. The start-up frequency of the motor can be made very low, by suitably adjusting the oscillator circuit, and then gradually increased, whereby to permit gradual acceleration of the rotor. In this way, although my motor operates in the steady-state as a synchronous motor, it does not require a separate start-up winding or an inconveneint start-up procedure, the motor being capable of synchronous or nearly synchronous operation over the complete range of speeds to be employed.

One particularly advantageous embodiment according to my invention incorporates a ring counter circuit having an input connected to the oscillator circuit and a plurality of outputs, each connected with a respective power transistor. Each power transistor is connected with and controls the flow of current through a respective stator winding and in this way the ring counter, through the intermediary of the respective power transistors, accomplishes the energization of successive ones of the stator windings, thereby establishing a revolving stator field. Utilizing this expedient, the time interval for which respective windings are energized, and the rate of transitions of state from one ring counter output to the next, is determined by the oscillatory frequency of the oscillator, whose pulses serve to drive the ring counter. Advantageously, though merely by way of example, the oscillator may be provided in form of an adjustable multivibrator.

I also contemplate the provision of a novel start-up arrangement, by means of which the motor is started-up automatically, without operator control of the acceleration. According to this concept, a feedback network feeds back to the oscillator a voltage corresponding to the rotational speed of the rotor. The magnitude, sign, and/or frequency of such speed-signal voltage serves to vary the oscillatory frequency of the oscillator. As one possibility, I contemplate feeding back to the oscillator a voltage corresponding to rotor speed, the sign of such voltage producing a corresponding increase or decrease in the oscillatory frequency, this increase or decrease advantageously being proportional to the magnitude of the fed-back voltage. In this way, a low start-up frequency for the oscillator may be set, to establish a slowly revolving field and to permit start-up of the rotor. As the rotor speed increases, and by provision of such regenerative feedback network, the oscillator frequently will also increase, thereby causing further acceleration of the rotor. Such process continues automatically, resulting in higher and higher speeds. When utilizing such construction, I provide speed-limiting means, which advantageously may be adjustable, and which may serve to limit the actual speed of the rotor or the frequency of the oscillator or the magnitude of the fed-back regenerative voltage. With the provision of such means, when the desired synchronous speed has been attained by the rotor, acceleration is discontinued, and steady-state operation commences. Such start-up acceleration of the rotor may easily be programmed by suitable choice of the feedback network or in other manner, and can be performed completely automatically, without operator control. I have found it a simple matter, utilizing this method of feedback, to establish operating characteristics for the motor which closely resemble those of conventional shunt-wound D.C. motors.

In addition to such automatic variation of the oscillator frequency during start-up, I also contemplate the variation of oscillator frequency at the will of an operator. Specifically, I contemplate adjustable setting of the initial start-up frequency of the oscillator for purposes of rotor start-up, as well as adjustable setting of the steady-state oscillator frequency corresponding to the steady-state rotational speed of the rotor. Advantageously, and quite simply, I can realize such control by connecting the oscillator to the D.C. voltage source for the motor by means of an adjustable RC-network, this RC-network serving as frequency-determining element. When the oscillator is constructed as a conventional multivibrator, for instance, the frequency-varying means may comprise adjustable resistor and/or capacitor means forming part of the multivibrator, and may also comprise voltage-varying means for varying the trigger voltages associated with the multivibrator.

For rotor-position-dependent control of winding energization after start up of the D.C. motor, the oscillator can be connected with the stator windings by means of an auxiliary feedback conductor and associated Zener diodes, or by means of other feedback networks. The Zener diodes can be so arranged, and their breakdown voltages so coordinated with the magnitude of voltages induced by the moving rotor in the stator windings of the stator, that when the preselected upper rotor speed has been reached the Zener diodes will be rendered conductive and will effectively disconnect the oscillator from the remainder of the control circuit, e.g., from the ring counter, if such is used. It is furthermore possible to connect each armature winding, preferably via diodes, with a respective stage of the ring counter, or other control circuit means, in in-phase relationship. By means of such a circuit arrangement the operating characteristics of the motor will particularly closely resemble those of a conventional shunt-wound D.C. motor.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
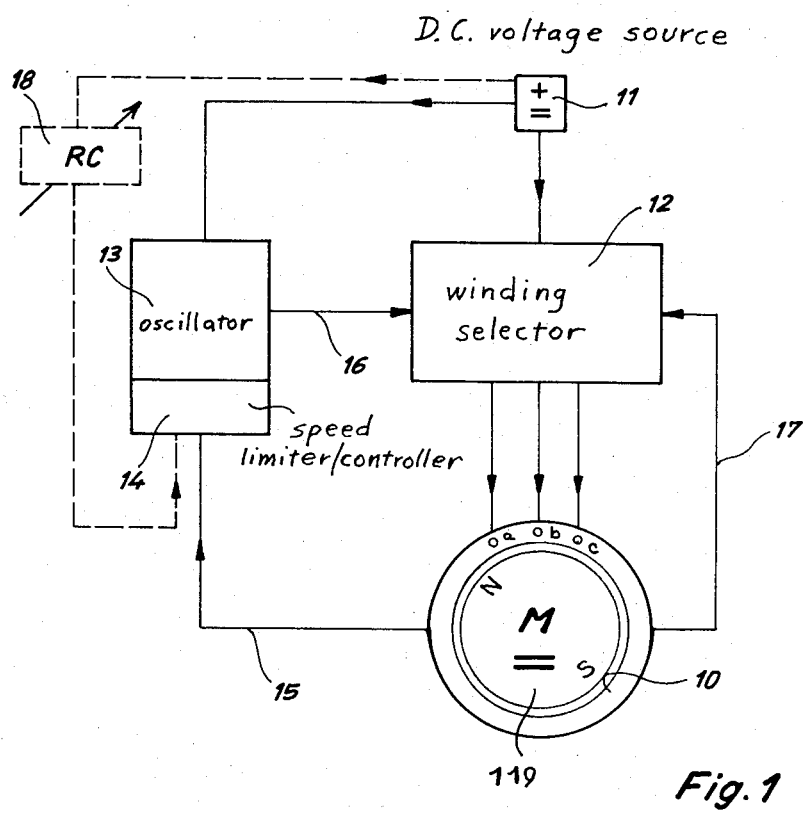
FIG. 1 illustrates in schematic form some of the principles which underlie the invention.

FIG. 1 is a generalized block diagram of a motor and control circuit according to the invention. The motor itself is illustrated schematically and identified by reference character M, and it comprises a permanently magnetized rotor 11a and a stator 10. Stator 10 is provided with three angularly spaced stator windings, illustrated schematically in the Figure and respectively identified by reference characters a, b, c. Each of windings a, b, c produces when energized a stationary magnetic field having a respective orientation.

The control circuit means according to this representation comprises winding selector 12, oscillator circuit 13, speed limiter 14, adjustable RC-network 18, as well as their interconnections. It will be seen that the several armature windings are respectively connectable to D.C. voltage source 11 by means of winding selector 12. Winding selector 12 is connected to oscillator 13 by means of conductor 16. During operation of the motor, winding selector 12 energizes successive ones of the angularly spaced windings a, b, c for respective time intervals determined by the oscillatory frequency of oscillator circuit 13. In this way, the control circuit, stator windings and D.C. voltage source cooperate to establish a net stator field which revolves with an angular frequency determined by the frequency of oscillator circuit 13.

Feedback conductor 15—which need not be a simple conductor, but can be whatever feedback network is desired for a particular application—feeds back from motor M a speed signal voltage corresponding to the angular speed of rotor 119. This fed-back voltage may correspond to rotor speed in its frequency and/or its magnitude, or in another manner, and is fed back to speed limiter/controller 14, associated with oscillator 13.

Speed limiter/controller 14 serves to limit the angular speed of rotor 18 to a predetermined maximum. According to the invention, limiter 14 may accomplish this purpose in any of several ways. It may incorporate a threshold detector which, when the frequency and/or magnitude of the speed signal has reached a predetermined maximum, serves to disconnect oscillator 13 from supply 11, or from winding selector 12, or which may terminate operation of oscillator 13 in some other manner.

Alternatively, I contemplate speed limiter means which, instead of directly monitoring the actual rotor speed, may serve to limit the frequency of the oscillator, and in that way regulate the speed of the rotor.

As a further alternative, speed limiter/controller 14 may serve to continuously control the oscillator frequency as a function of rotor speed, and not merely limit the rotor speed and/or oscillator frequency to a predetermined upper limit. This possibility is more clearly set forth in FIG. 2.

Adjustable RC-network 18 is illustrated in FIG. 1 to represent the possibility of adjustably controlling the oscillatory frequency of oscillator circuit 13, over and above control of such frequency via automatic speed controller/limiter 14.

Symbolically depicted feedback network 17 represents the possibility of feeding back to winding selector 12 synchronization signals corresponding to rotor speed and/or rotor position, thereby bypassing oscillator 13.

Figure 2:
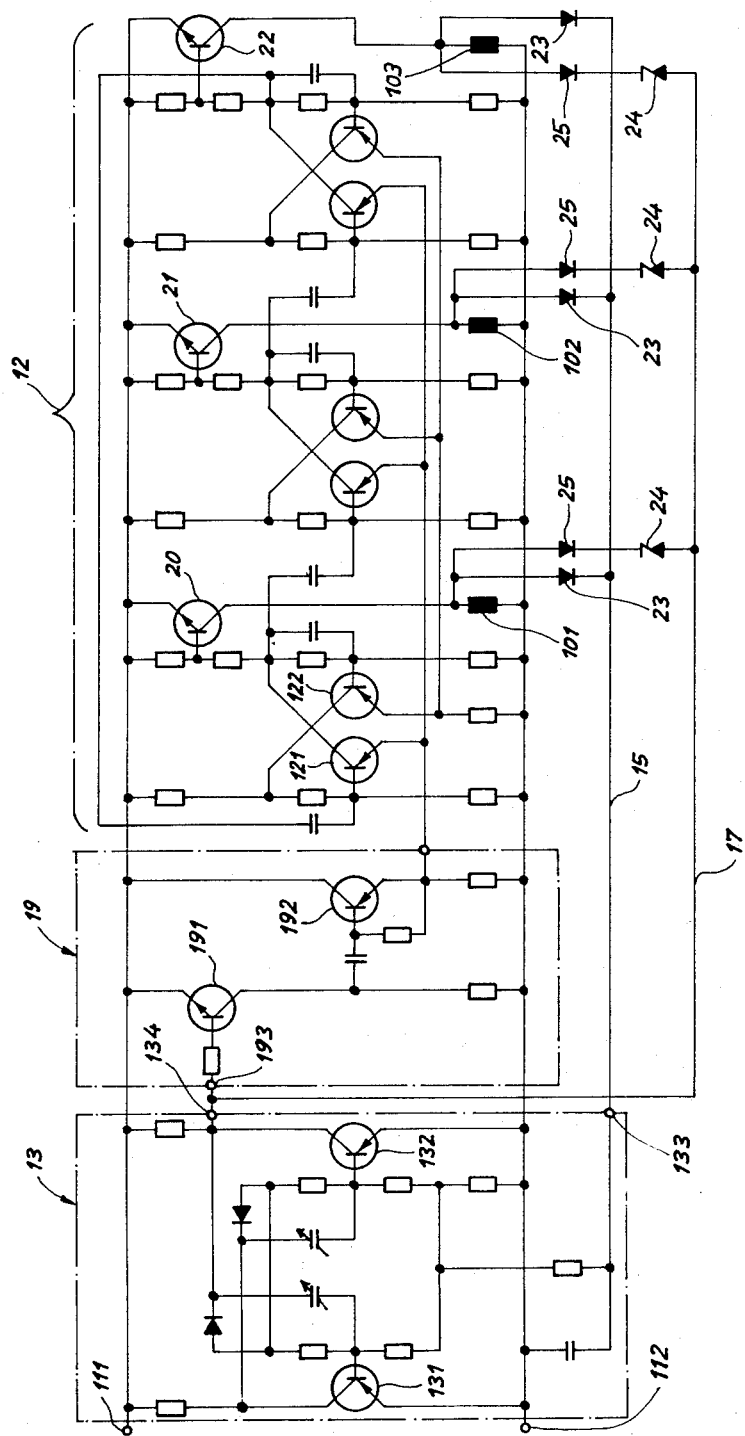
FIG. 2 illustrates one exemplary control circuit according to the invention.

A concrete control circuit according to the invention, incorporating many of the features outlined above, is illustrated in FIG. 2. Very advantageously in this Figure, but merely by way of example, winding selector 12 is provided in form of a conventional ring counter having, in this embodiment, three circuit stages. Each stage includes a bistable multivibrator comprising two transistors 121, 122, and each stage has associated with it a respective one of power transistors 20, 21 and 22. The emitter of each such power transistor is connected to negative supply terminal 111. The collector of each transistor 20, 21, 22 is connected to one end of a respective stator winding 101, 102 or 103, the other ends of which are connected to positive supply terminal 112. Each bistable multivibrator controls the conduction state of the respective one of power transistors 20, 21, 22, which latter in turn serve to connect or disconnect the respective stator winding with the supply.

The triggering pulses for ring counter 12 are furnished by triggering 13 through the intermediary of coupling stage 19. In this embodiment, triggering means 13 comprises a conventional astable multivibrator including two transistors 131, 132 and various resistances and capacitances, whose respective values determine, in the usual manner, the on and off times of each transistor, and thus the overall signal reptition frequency.

It will be seen that, in this embodiment, astable multivibrator 13 comprises two adjustable capacitors forming part of frequency-varying means and permitting adjustment of the respective on- and off-times of transistors 131 and 132, and thereby permitting adjustment of the overall oscillatory frequency. Clearly, the provision of adjustable capacitors is merely exemplary, it being possible and usually preferable to make one of the multivibrator resistances adjustable.

The operation of that part of the circuit thus far described will be self-evident. When supply terminals 111, 112 are connected to power, oscillator 13 will commence to oscillate at a predetermined frequency. The pulses generated by oscillator 13 will be transmitted to and drive ring counter 12, through the intermediary of coupling stage 19. Successive ones of the three ring counter stages will be brought to a condition permitting conduction of the respective power transistor, thereby resulting in energization of successive ones of stator windings 101, 102, 103. In this way, a revolving magnetic field will be produced, which the rotor of the motor will follow synchronously.

According to the embodiment of FIG. 2, provision is additionally made for an automatically controlled start-up operation. For this purpose, the frequency-varying means of FIG. 2 further includes three diodes 23, which form part of speed-signal means, each being connected to a feedback conductor 15, which in turn is connected to control point 133 and applies a feedback voltage to the circuitry of the astable multivibrator. As will be appreciated by those skilled in the art, during running of the motor a voltage is induced in each of stator windings $a$, $b$, and $c$, this induced voltage being proportional to the speed of the rotor and having a sense which in the illustrated circuit alters the overall voltage across the respective stator winding terminals. Frequency-varying diodes 23 are each so connected to one terminal of a respective stator winding 101, 102 or 103 that they each, via feedback conductor 15, feed back to control point 133 a voltage whose magnitude changes in proportion to changes of rotor speed. This speed signal voltage is smoothed by the capacitor connected between terminals 112, 133 and is applied to the internal circuitry of multivibrator 13. Depending on the magnitude of the feedback speed signal voltage, the respective one of transistors 131, 132 is triggered sooner or later, its on or off time being accordingly altered, thereby resulting in a change in the overall oscillatory frequency of the oscillator.

The operation with this part of the circuit taken into account is as follows. When supply terminals 111, 112 are connected to a source of D.C. voltage, oscillator 13 commences to oscillate at a predetermined start-up frequency, which may be adjustably pre-set by means of the illustrated adjustable capacitors. This start-up frequency will ordinarily be quite low, so as to permit the acceleration from standstill of the rotor. As the rotor speed increases, the voltage induced in the respective stator windings 101, 102, 103 is communicated to control point 133 via diodes 23 and feedback conductor 15. The change in net voltage across windings 101, 102, 103 will make itself felt at control point 133 as a voltage change. This voltage increase results in earlier transition of the multivibrator from the one to the other of its states, and thereby results in an overall increase of the oscillatory frequency. The increased oscillatory frequency causes the revolving stator field to revolve at a somewhat higher speed, resulting in further acceleration of the rotor. This regenerative feedback accordingly assures that the rotor will be brought from standstill to a substantial speed in an automatic operation, the increases of speed of the revolving field never exceeding the capacity of the rotor to accelerate correspondingly. Obviously, with this circuit arrangement the start-up procedure becomes quite simple, not depending on the subjective judgement of the operator, and not requiring auxiliary start-up windings or the like.

From what has just been said, it will be appreciated that the use of regenerative feedback necessitates the provision of some sort of speed-limiting means. In the embodiment of FIG. 2 I provide speed-regulating means in the form of shut-off means which effectively disconnect the oscillator 13 from ring counter 12 when the rotor speed reaches a predetermined maximum value. Such shut-off means here comprises three diodes 25 and three Zener diodes 24. As has already been explained, an increase of rotor speed makes itself felt as a voltage change at control point 133, and thus also as a voltage change at the anodes of diodes 23 and 25. It will be seen that the circuits of Zener diodes 24 are connected between the lower-voltage terminal of windings 101, 102, 103 and a circuit point 193. Accordingly, an increase of rotor speed results in an increased voltage across Zener diode 24. When this voltage reaches the threshold value of the Zener diode, corresponding to the desired maximum speed, the Zener diode becomes conductive. As a result, and for as long as the rotor speed exceeds the predetermined limit value, the voltage between circuit points 133 and 134 will be fixed, effectively disconnecting the oscillator 13 from the ring counter 12. In this way, speed regulation is achieved.

I wish to emphasize that while, for the purposes of simplicity, I have illustrated speed-regulating means including Zener diodes as threshold-detecting components, other arrangements are of course possible, and in many cases preferable. In particular, for the sake of flexibility it may be desired to provide threshold-detecting means which are adjustable and which respond to a threshold value selected at the will of the operator.

It will be understood that each of the elements described above, or two or more together, may also find a useful application in other types of constructions and circuit arrangements differing from the types described above.

While the invention has been illustrated and described as embodied in a collectorless D.C. motor, it is not intended to be limited to the details shown, since various modifications and structural changes may be made without departing in any way from the spirit of the present invention.

In the embodiment of FIG. 2, a ring counter 12 is employed which has a plurality of stages, each connected with a single one of windings 101, 102, 103. However, such manner of connection is by no means the only possible one. Each stage of the ring counter may control the conduction of a plurality of power transistors, each such transistor connected to a respective stator winding. Alternatively, each power transistor could serve for energization of a plurality of stator windings—e.g., for two or more windings which are angularly spaced and in which when they are energized a common current flows. Likewise, each stage of the ring counter might control a plurality of transistors, each of which carries current for a plurality of stator windings. There are of course many similar possibilities. In particular, it is emphasized that while in FIG. 2 a ring counter having three stages, corresponding to three transistors and three stator windings, is used, a ring counter having any number of stages may of course be employed. Furthermore, whereas in FIG. 2 only one stage of the ring counter at a time is in a state to energize a winding, a ring counter or the like could equally well be employed in which at any given moment more than one stage is in a state to energize a winding, and in which several such states would travel simultaneously about the circle of interconnected bistable elements, or the equivalent.

Without further analyses, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A collectorless D.C. motor, comprising, in combination, a rotor; a stator; a plurality of stator windings arranged on said stator in angularly spaced relationship and each producing when energized a stationary magnetic field having a respective angular orientation; triggering means comprising free-running adjustable-frequency oscillator means having an output and operative for furnishing at said output a train of triggering signals having a signal repetition frequency, and rotor-speed-responsive frequency-varying means connected to said free-running adjustable-frequency oscillator means and operative for continuously varying the frequency of said free-running adjustable-frequency oscillator means in dependence upon the speed of said rotor; and a ring counter ciruit having an input connected to said output for receipt of triggering signals, and comprising a plurality of circuit stages each capable of undergoing transistions between a first and a second state, and each stage being so connected to a respective one of said stator winding means as to effect energization of the respective one of said stator winding means when in said second state, and wherein said stages are connected together in a circle in such a manner that upon receipt of successive triggering pulses at said input successive ones of said stages undergo a transition to said second state, so that successive ones of said stator winding means are energized in sequence to create a rotating magnetic field.

2. A motor as defined in claim 1, wherein said free-running adjustable-frequency oscillator means consists of a free-running adjustable-frequency oscillator having an input for receipt of a D.C. signal and is operative for furnishing a train of triggering signals having a signal repetition frequency dependent upon the amplitude of such D.C. signal, and wherein said frequency-varying means further comprises speed signal means for applying to said input of said free-running adjustable-frequency oscillator a D.C. signal indicative of rotor speed.

3. A motor as defined in claim 2, wherein said speed signal means consists of means for applying to said input of said free-running adjustable-frequency oscillator a substantially flat D.C. signal having a level indicative of rotor speed.

4. A motor as defined in claim 1, said frequency-varying means comprising means for producing an increase in said signal repetition frequency in response to to an increase of rotor speed.

5. A motor as defined in claim 1, said frequency-varying means comprising means for establishing a signal repetition frequency having a predetermined start-up value when said rotor is being started-up.

6. A motor as defined in claim 1, said triggering means comprising additional frequency-varying means for varying the signal repetition frequency of said train at the will of an operator.

7. A motor as defined in claim 6, said additional frequency-varying means comprising an adjustable RC-network.

8. A motor as defined in claim 1, said signal repetition frequency having a start-up value when said rotor is being started-up, and said triggering means comprising means for adjustably determining said start-up value.

9. A motor as defined in claim 1, and further including speed regulating means for regulating the speed of said rotor.

10. A motor as defined in claim 1, and further including shut-off means for terminating energization of successive ones of said winding means when the rotor exceeds a predetermined value.

11. A motor as defined in claim 10, said shut-off means including voltage-threshold means connected with at least one of said stator for producing a shut-off signal when the induced voltage in said at least one stator winding reaches a threshold value.

12. A motor as defined in claim 11, said voltage-threshold means comprising Zener diode means.

13. A motor as defined in claim 1, said triggering means comprising a multivibrator.

14. A motor as defined in claim 1, said rotor comprising permanent magnet means.

15. A motor as defined in claim 1, said circuit stages comprising a plurality of current-furnishing power transistors, each connected with a respective one of said stator winding means.

* * * * *